United States Patent [19]

Hansen

[11] Patent Number: 5,091,007
[45] Date of Patent: Feb. 25, 1992

[54] NAPHTHENIC-AROMATIC HYDROCARBON COMPOSITIONS

[76] Inventor: Nils Hansen, Heilhollkamp 11, 2000 Hamburg 60, Fed. Rep. of Germany

[21] Appl. No.: 617,079

[22] Filed: Nov. 21, 1990

[30] Foreign Application Priority Data

Nov. 21, 1989 [DE] Fed. Rep. of Germany ....... 3938620

[51] Int. Cl.[5] ...................... C09D 11/08; C09D 11/00
[52] U.S. Cl. ........................ 106/30; 106/32; 524/474; 524/490; 525/210
[58] Field of Search ................ 524/474, 490; 525/210; 106/23-32

[56] References Cited

U.S. PATENT DOCUMENTS

| | | | |
|---|---|---|---|
| 1,511,816 | 10/1924 | Marston et al. | 524/474 |
| 3,402,140 | 9/1968 | Bickel et al. | 524/490 |
| 3,819,386 | 6/1974 | Higgins et al. | 106/27 |
| 4,066,717 | 1/1978 | Li et al. | 525/210 |
| 4,101,478 | 7/1978 | Kostjuchenko et al. | 524/87 |
| 4,657,591 | 4/1987 | Shiol et al. | 106/23 |
| 4,853,428 | 8/1989 | Theodore et al. | 524/490 |

Primary Examiner—William R. Dixon, Jr.
Assistant Examiner—Margaret V. Einsmann
Attorney, Agent, or Firm—Cushman, Darby & Cushman

[57] ABSTRACT

A predominately naphthenic-aromatic hydrocarbon composition characterized by a content of about 5 to about 50 parts per weight of indene cumarone resins and about 50 to about 95 parts per weight of a mineral oil cut having a boiling range between approximately 200° C. to 600° C. and by a PCA content of less than 0.01%.

9 Claims, No Drawings

NAPHTHENIC-AROMATIC HYDROCARBON COMPOSITIONS

FIELD OF THE INVENTION

The present invention relates generally to compositions, predominantly made up of naphthenic-aromatic hydrocarbon compounds and to methods of using such compositions. More specifically, the present invention relates to predominantly naphthenic-aromatic hydrocarbon compositions made by mixing indene cumarone resins and mineral oil with a boiling range of between about 200° C. to 600° C. wherein the composition contains minimal amounts of polycyclic aromatic compounds ("PCAs"). These compositions are useful, among other things, as ingredients used in printing inks and printing ink oils as well as softeners for us with natural or synthetic rubber products.

BACKGROUND OF THE INVENTION

In connection with the fractionated distillation of petroleum crude, there is a residue after the heating oil fractions have been distilled off, which essentially consists of asphalt, bitumen and wax, as well as of so-called heavy oil having a boiling temperature above 350° C. This heavy oil can be further processed into different products, such as spindle and lubricating oils, solvates, softeners, components of solvents with high boiling points, and so forth.

For decades, certain fractions of these heavy oils have been used in the printing industry as components of printing inks. In addition, these fractions are also used in rubber and caoutchouc processing as softeners.

These so-called extracts or fractions, used by the industry in large amounts, are still extraordinarily inexpensive, so up to now there has been little discussion regarding their replacement by other substances. Also, up to a relatively short time ago there has been no detailed research regarding the composition of these distillation products or solvent extracts; such research has only been conducted very recently and has had the result, surprising even to experts, that some of the extracts contain up to 40% or 50% of PCAs (in accordance with IP 346).

Polycyclic aromatic compounds ("PCAs") are understood by the art to be aromatic compounds with condensed closed chain systems, many or almost all of which have proven to be carcinogens or at least co-carcinogens. Examples of these are benzo[a]pyrene and methylcholanthrene. The carcinogenic properties of individual compounds appear to be linked to the presence of so-called bay regions; extensive research by Lowe et al. is available in *Accounts Chem. Res.*, 17, (1984), 332 et seq. Furthermore, it is also known that many PCAs also trigger mutagenic effects and may furthermore be phototoxic. Thus, it is highly desirable to minimize contact with such compounds.

For example, five PCAs have been included in Section III A2 of Germany's the "Draft of the Second Change of the Gefahrstoffverordnung," i.e. "Dangerous Materials Law" because of these properties. Accordingly, it is highly desirable to minimize the release of these potential carcinogens into the environment.

Therefore attempts have been made by the prior art to replace the customarily used extracts by other hydrocarbons, but all these attempts have to a great extend failed because the replacement oils have shown technical disadvantages in the printing ink industry as well as in the rubber industry, which technical deficiencies have reduced their usefulness completely or to a very large degree. For example, it is known that alternative oils of essentially paraffin-naphthene structure are less satisfactory as softeners for most synthetic rubbers because they have only a small compatibility with rubber, so that there is danger of bleeding of the softener from the compound in the course of the vulcanization process. Therefore such mineral oils are less compatible in IR, SBR, BR, NBR, CR and NR rubbers. Similar deficiencies have been found in the replacement oils used in the printing ink industry. For example, it is known that a large portion of paraffins is incompatible with the resins/carbon blacks, etc. used in printing inks.

Therefore there still is a need for a hydrocarbon composition as an alternative or replacement for the sump distillates or extracts used up to now, for example, in the rubber industry or in the production of printing inks. The present invention seeks to overcome these problems of prior art replacement oils through the formulation of compositions, predominantly made up of naphthenic-aromatic hydrocarbon compounds.

SUMMARY OF THE INVENTION

The present invention relates to predominantly naphthenic-aromatic hydrocarbon compositions. More specifically, the present invention relates to a predominantly naphthenic-aromatic hydrocarbon composition comprising indene cumarone resins and mineral oil with a boiling range of between about 200° C. to 600° C., and methods of using these compositions. This composition may be defined as a predominantly naphthenic-aromatic hydrocarbon composition comprising from about 5 to about 50 parts per weight of indene cumarone resins and from about 50 to about 95 parts per weight of a mineral oil cut having a boiling range between about 200° C. to about 600° C. wherein the composition contains an amount of polycyclic aromatic compounds (PCAs) that is less than about 0.01 percent by weight.

Another aspect of the present invention is a method of using the disclosed naphthenic-aromatic hydrocarbon compositions as softener for natural or synthetic rubber. Another aspect of the present invention relates to a method of using the disclosed naphthenic-aromatic hydrocarbon compositions as a component in printing inks.

DETAILED DESCRIPTION OF THE PREFERRED EMBODIMENTS

The present invention relates to predominantly naphthenic-aromatic hydrocarbon compositions and methods of using the disclosed compositions in formulating rubber products and printing inks.

The incompatibility of the predominantly paraffinic mineral oils found in the prior art can be overcome in connection with the known uses, if a hydrocarbon compound of predominantly naphthenic-aromatic character is used. However, it is critical that the contents of aromatic portion should be as free as possible of PCAs because of the carcinogenic risk associated with PCAs. The present invention disclose such compositions with a PCA content that lies below 0.01 percent by weight.

The present invention discloses predominantly naphthenic-aromatic hydrocarbon compositions which are very low in PCAs, and yet still retains the properties desired for its use as softeners in rubber and for its use in the production of printing inks. Thus the disclosed compositions are comparatively harmless to health, at least no carcinogenic activity is known in connection with these compositions.

The mineral oil disclosed and used herein is a distillation cut having a boiling range of about 200° C. to about 600° C. Preferably the mineral oil cut used has an aromatic compound content of from between 0 percent to 30 percent by weight (Deutsches Industrie - Norm (Standards) DIN 51378), a density of about 0.8 g/cm$^3$ to 1.2 g/cm$^3$ at 20° C. and a flash point above about 60° C.

It is also preferred if the aromatic compound content consists almost exclusively of non-polycyclic aromatic compounds, mainly substituted and/or unsubstituted aromatic hydrocarbons or aromatic heterocyclic compounds. It is most preferred if the mineral oil aromatic portion is predominantly made up of mono- or double-nuclear aromatic hydrocarbons or heterocyclic compounds. Again these may be substituted or not as desired.

The second component of the composition according to the present disclosure consists of indene cumarone resins. Indene cumarone resins are understood to be a group of thermoplastic resins which are obtained by polymerization of certain fractions of the light oil obtained in the course of distillation of coal tar or from distillation of petroleum. These so-called resins with boiling ranges of approximately 160° C. to 185° C. contain up to 60% of polymerisable substances, mainly indene and cumarone as well as their mono- and dimethyl derivatives as well as small amounts of dicyclopentadiene. Viscous to solid substances are obtained from these compounds by means of the action of acid or Lewis acids, which react practically neutral, are non-saponifiable and dissolve in aromatic hydrocarbons.

The content of the resins vary depending on the initial products used for their production. A preferred indene cumarone resin will have a density of about 0.9 g/cm$^3$ to 1.3 g/cm$^3$, a flash point above 60° C. It is also preferred to use an indene cumarone resin wherein the aromatic compound content is up to about 50 percent by weight, although a greater percentage may be used if desired.

A more preferred indene cumarone resin will have an aromatic compound content of from about 10 percent to about 50 percent by weight. It is also desirable that such a compound be predominantly made up of double-nuclear aromatic compounds.

A preferred naphthenic-aromatic hydrocarbon composition of the present invention will be prepared in such a way, that the total naphthene content is in the range of about 30 to about 40 percent by weight. In addition, such a composition will have aromatic compound content of about 25 to more than 40 percent by weight. Furthermore, such a composition will have a paraffin content of from about 20 to 42 percent by weight. In addition, such compositions may exhibit a broad range of viscosity. A preferred range being from about 400 mm$^2$/sec at 20° C. to about 10$^4$ mm$^2$/sec at 20° C.

The PCAs content of these compositions will lie below about 0.01 percent by weight as determined in accordance with the method of Prof. Grimmer, Hamburg-Ahrensburg, published in Fresenius, "Analytische Chemie", 1983, Vol. 314, pp. 29-36.

If desired, a thickening agent, such as polyisobutylene or polyethylene can be worked into the composition in order to set a desired viscosity.

Manufacture of the napthenic-aromatic hydrocarbon composition according to the invention takes place in a simple manner by mixing the oil component with liquid indene cumarone resin at room temperature. If desired slight heating may be used to speed this mixing process up.

The hydrocarbon compositions in accordance with the present invention are preferably used in the production and processing of printing ink or as softeners for rubber, natural as well as synthetic, although they may be used for various other products. The compositions made of mineral oil cuts and indene cumarone resin can also compete from the point of view of costs with the extracts used up to now. However, in contrast to the customary products the PCA contents of the present invention are drastically reduced and are within a range which, in the general view of science, can be considered to be safe from the point of view of health.

The following examples are intended to exemplify the operation of the present invention but not to limit its scope.

EXAMPLE 1

50 parts of a mineral oil cut with a density of 0.9 g/cm$^3$ and a viscosity of approximately 2·10$^4$ mm$^2$/sec at 20° C. and an aromatic compound content of approximately 20% were mixed with 50 parts of a liquid indene cumarone resin with a flash point above 60° C. and a density of approximately 1.1 g/cm$^3$ and a viscosity of approximately 10$^4$ mm$^2$/sec and were slightly heated. The finished compound is a light-brown clear oil with an aromatic compound content of 40%, a naphthene content of 40% and a paraffin content of 20%. The PCA content determined in accordance with the method of Prof. Grimmer lies below 0.004%. The viscosity is 10$^4$ mm$^2$/sec at 20° C.; diffraction index 1.5635/20° C.; viscosity-gravity constant (VDK) 0.963.

EXAMPLE 2

50 parts of a mineral oil cut with a density of 0.9 g/cm$^3$ and a viscosity of 8·10$^3$ mm$^2$/sec at 20° C. and an aromatic compound content of 20% were mixed with 50 parts of a liquid indene cumarone resin with a flash point above 60° C. and a density of approximately 1.1 g/cm$^3$ and a viscosity of approximately 10$^4$ mm$^2$/sec and were slightly heated. The finished compound is a light-brown clear oil with an aromatic compound content of 41%, a naphthene content of 36% and a paraffin content of 23%. The PCA content determined in accordance with the method of Prof. Grimmer lies below 0.01%. The viscosity is 4650 mm$^2$/sec at 20° C.; diffraction index 1.5632/20° C.; viscosity-gravity constant (VDK) 0.962.

EXAMPLE 3

91 parts of a mineral oil cut with a density of 0.9 g/cm$^3$ and a viscosity of 8000 mm$^2$/sec at 20° C. and an aromatic compound content of 20% were mixed at 20° C. with 50 parts of a liquid indene cumarone resin with a flash point above 60° C. and a density of approximately 1.1 g/cm$^3$ and a viscosity of approximately 10000 mm$^2$/sec and slightly heated. The finished compound forms a light-brown clear oil with an aromatic compound content of 24%, a naphthene content of 34% and a paraffin content of 42%. The PCA content determined in accordance with the method of Prof. Grimmer lies below 0.01%. The viscosity is 400 mm$^2$/sec at 50° C.; diffraction index 1.5289/20° C.; viscosity-gravity constant (VDK) 0.888. If desired, a thickening agent, such as polyisobutylene or polyethylene can be worked into the compound in order to set a desired viscosity.

What is claimed is:

1. A predominantly naphthenic-aromatic hydrocarbon composition comprising from about 5 to about 50 parts per weight of indene cumarone resins and from about 50 to about 95 parts per weight of a mineral oil cut having a boiling range between about 200° C. to about 600° C. wherein the composition contains an amount of polycyclic aromatic compounds (PCAs) that is less than about 0.01 percent by weight.

2. The naphthenic-aromatic hydrocarbon composition of claim 1 wherein the mineral oil component consists of a cut with an aromatic compound content of between about 0 to about 30 percent by weight, a density of from about 0.8 g/cm$^3$ to about 1.2 g/cm$^3$ at 20° C. and a flash point above 60° C.

3. The naphthenic-aromatic hydrocarbon composition of claim 1 wherein the indene cumarone resins used have a density of about 0.9 g/cm$^3$ to about 1.3 gm/cm$^3$, a flash point above 60° C. and an aromatic compound content of from about 10 percent to about 50 percent by weight.

4. The naphthenic-aromatic hydrocarbon composition of claim 1 wherein the mineral oil aromatic portion is predominantly made up of mono- or double-nuclear aromatic hydrocarbons or heterocyclic compounds.

5. The naphthenic-aromatic hydrocarbon composition of claim 1 wherein the mineral oil aromatic portion is predominantly made up of mono- or double-nuclear substituted aromatic hydrocarbons or heterocyclic compounds.

6. The naphthenic-aromatic hydrocarbon composition of claim 3 wherein the aromatic compound content is predominantly made up of double-nuclear aromatic compounds.

7. The naphthenic-aromatic hydrocarbon composition as in claim 1, 2, 3, 4, 5, or 6 wherein the content of naphthenes is from about 30 to about 40 percent by weight and the aromatic compound content is at least about 25 percent by weight.

8. A method for softening natural or synthetic rubber by incorporating into the rubber an effective amount of the naphthenic-aromatic hydrocarbon composition as defined in claim 1.

9. A method for preparing printing ink oil by incorporating into the ink an effective amount of the naphthenic-aromatic hydrocarbon composition as defined in claim 1.

* * * * *